Jan. 13, 1970        A. CARABASSE        3,488,877
ROTARY FISHING TACKLES

Filed March 8, 1968        3 Sheets-Sheet 1

INVENTOR
ANDRÉ CARABASSE
BY
Bacon & Thomas
ATTORNEYS

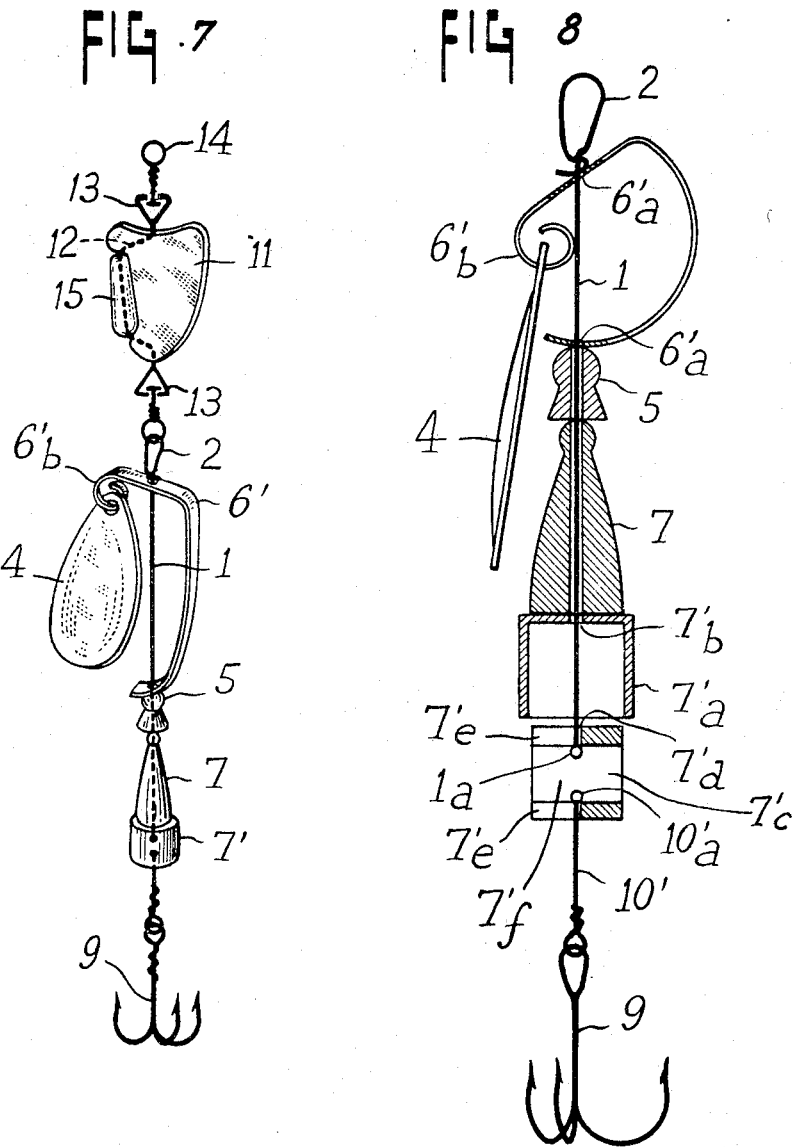

Jan. 13, 1970  A. CARABASSE  3,488,877
ROTARY FISHING TACKLES
Filed March 8, 1968  3 Sheets-Sheet 3
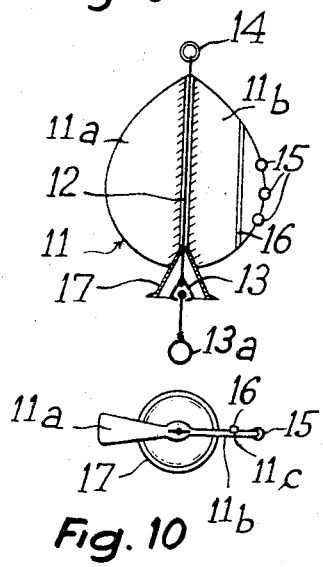
Fig. 9
Fig. 10
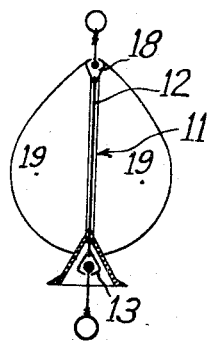
Fig. 11
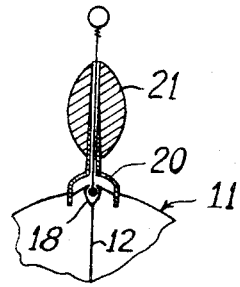
Fig. 12
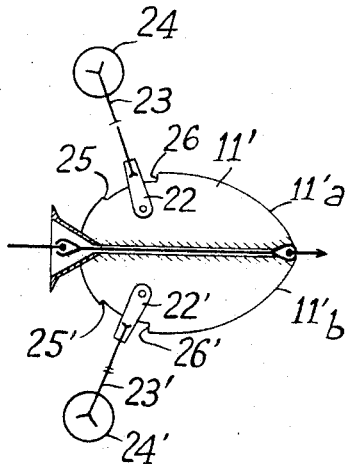
Fig. 13
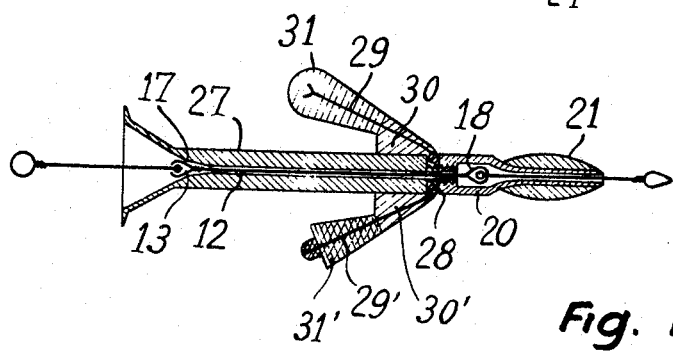
Fig. 14
INVENTOR
ANDRÉ CARABASSE
BY Bacon & Thomas
ATTORNEYS United States Patent Office 3,488,877
Patented Jan. 13, 1970

3,488,877
ROTARY FISHING TACKLES
André Carabasse, 22 Rue Rouget de l'Isle,
Saint-Prix, France
Filed Mar. 8, 1968, Ser. No. 711,645
Claims priority, application France, Mar. 10, 1967,
98,278; Apr. 18, 1967, 103,194
Int. Cl. A01k 85/00
U.S. Cl. 43—42.09                                17 Claims

ABSTRACT OF THE DISCLOSURE

A lure for sport fishing having interchangeable pieces comprising a shank portion ending in a loop to which may be attached an anti-twisting device which is adapted to be attached to a fishing line. The shank portion has freely rotatably mounted thereon a saddle supporting a removable blade portion, a plurality of rotatable pieces on which the saddle is supported, a spacing element, a removable sinker mounted near the lower end, and a hook removably attached to the lower end.

---

Several types of rotating tackles or lures are known, in particular lures having a shank portion which terminates at its upper end in a loop which is attached to a fishing line. A stirrup with a blade is mounted to freely rotate around the shank. The stirrup itself bears against rotating portions carried on the shank. The lower end of the shank portion terminates in a loop which is attached to a hook. A weight or sinker is clamped on the shank at the level of the loop. However, the elements constituting such a lure are securely fixed on this shank. The lures cannot be distinguished one from the other except for the form of the rotary blades, their color, their design, the turning pieces themselves, the form of their sinkers and the size of the hooks. The blades are of various sizes and may be oval with a slightly convex surface, having an area of from 170 mm.$^2$ to 520 mm.$^2$.

When fishing in a river having different depths, it is necessary to employ many lures having different weights; for the attraction of different fish, different forms and color blades must be used. The fisherman is therefore required to own and to carry a large number of such lures.

Furthermore, when the hook becomes caught on an obstacle, the fishing line may break and the entire lure may be lost.

It has been observed that this collection of a large number of lures is very expensive and when carried with the other necessary accessories used by a fisherman may considerably hamper the movements of the fisherman. In accordance with the invention, this large number of lures may be advantageously replaced by a single lure of a new type having an assortment of interchangeable blades, removable sinkers, hooks, and a simple securing device, which, in the case a hook may be entangled in an obstacle, limit the loss thereof simply to the hook which may be easily replaced.

To this end, the improved lure according to this invention comprises essentially:

A shank terminated at its lower end by a loop to which may be eventually fixed a fishing line through the intermediary of an anti-twisting device, A lure removably hung on a saddle, which saddle is rotatably mounted around the shank, A plurality of rotatable pieces threaded on the shank and on which the saddle bears, A spacing element threaded on the shank, A removable sinker mounted near the end of the shank, And a hook removably associated with the end of this shank.

With the lure of this invention, a large number of interchangeable blades, having different forms and colors, spacing elements having different lengths, and interchangeable sinkers of different weights may be utilized. Therefore, by simply changing a sinker, a river having different depths may be properly explored, or different fish may be attracted merely by changing the blade.

According to another characteristic, the hook is attached to a line, which line has a resistance to rupture inferior to that of the fishing line itself, and this line is fixedly held in a sinker.

Thus, in the case of a normal lure, the fish when struggling against the hook would normally break the fishing line and therefore escape with the entire lure, whereas with this invention only the hook itself would be lost.

According to another characteristic of the invention, the saddle is made from a ring which has been cut in such a manner that the upper branch has a length or thickness which is slightly reduced. The removable blade contains a hole for mounting the blade on the saddle, which hole is provided with a slot which tangentially slants from the bottom of the hole and ends at the side of the plate. With this hole and slot the blade is mounted on the saddle by placing the slot of the blade on the upper branch of the saddle and swinging the blade so as to carry it to the lower branch of the saddle.

According to a modification, the blade does not have a slot, but the saddle is provided with an opening means near its upper branch.

According to another characteristic, the spacing element is comprised of a slotted tubular element, held on the shank between the rotating elements.

According to a modification, the spacing element is comprised of an elbowed spring blade having mounting holes at its extremities.

According to another modification, one of the extremities of the spring blade terminates in a cast ring on which the interchangeable plates may be mounted.

According to another characteristic, the sinker is comprised of two semi-circular pieces held together by spring clips which rest in annular grooves formed around these pieces.

According to still another modification, the lower extremity of the shank ends in an enlarged portion or bulge having a diameter which is less than that of the mounting openings of the pieces carried on the shank, such as the saddle, rotatable pieces, spacing elements and sinkers, thus allowing all of the pieces to be easily removed from the assembly.

The different elements of the assembly are maintained in place by a locking element which may also take the place of the sinker, and which may comprise two cylindrical pieces, one contained within the other, that is to say a cap element perforated by an axial hole having a diameter greater than that of the bulge on the shank so as to allow the passage of this cap element over the shank, and a trundle provided with axial holes each having a diameter which is less than to that of the bulge, and having a diametrical hole whose diameter is greater than that of the bulge. The trundle is further provided with radial slots ending at the axial holes and having a width which is smaller than the diameter of the bulge. The hook is also attached to a line which terminates in an enlarged or looped stop portion having a diameter which is larger than the width of the radial slots.

Moreover, it is well known that for stopping the fishing line from becoming twisted and entangled a swivel is placed between the fishing line and a fishing tackle such as one in which a spoon is used as a lure.

However, it is also known that when in actual operation the swivel placed between the fishing line and the fishing tackle does not eliminate the twisting torque produced by the rotation of the fishing tackle, even if the water is perfectly calm.

Therefore, there is nothing to stop this twisting action except for the elastic reactivity of the fishing line, which is not constant and which varies when immersed in water. It therefore follows that the fishing line is always twisted during fishing. By unrolling a fishing line which has been rolled on a reel, and dividing this line into successive lengths and measuring the number of successive twists therein, any fisherman may note that each portion is in fact very irregularly twisted, in such a manner that it forms "perukes," which are very disagreeable and which are known to all practitioners of various forms of cast fishing.

The only means at the disposition of the fisherman for reducing the effects of these twists, outside of lures which rotate in a reverse direction, and the employment of which is not generally known, consists in the use of lines having a diameter which is much greater than necessary. But, this causes the most suspicious fish to be driven away.

The invention has also for an object an anti-twisting apparatus allowing the elimination and limitation of the inconveniences set forth above.

With this end in mind, the anti-twisting device according to this invention comprises at least one swivel engaged with the end of a flat or finned weighted float.

According to one modification, the weighted float is constituted by a flat plate made from a material much lighter than water, and which is provided with weights on one part of its periphery in such a manner that the plate floats vertically in the water.

According to another characteristic of this invention, the weighted float includes a braking cone surrounding the swivel and opposing the advancement of the anti-twisting device into the water.

According to a modification, the flat plate further includes supplementary fins on both sides of the plate.

According to another modification, the weighted float carries two swivels fixed at the opposite extremities of the axis of the float. The forward swivel may be protected by a cover.

According to another modification, the weighted float comprises a flat plane composed of two fins of the same thickness on which are articulated, in the plane of the plate and exteriorly thereof, two arms, one of which terminates in a float and other of which terminates in a sinker.

According to yet another modification of this invention, the weighted float is composed of a nearly cylindrical elongated body carrying swivels at its two ends. The outlet ends of this body being extended by a braking cone surrounding the outlet swivel. The inlet end of the body is provided with a screwthread which may receive a leaded cover for the protection of the inlet swivel. When provided with this cover, an annular ring having two arms, one terminating in a float and the other in a sinker is held between the cover and the body.

A more complete appreciation of the invention and many of the attendant advantages thereof will be readily seen and the same can be better understood by reference to the following description when considered in connection with the accompanying drawing wherein:

FIGURES 7 and 8 show modifications of the invention as shown in FIGURE 1.

FIGURE 9 shows a plan view, partly in cross section of an anti-twisting device according to the invention;

FIGURE 10 shows an end view of the anti-twisting device of FIGURE 9;

FIGURES 11 and 12 show modifications of the anti-twisting device in accordance with FIGURE 9;

FIGURE 13 shows a plan view partly in cross section of another modification of the apparatus according to this invention;

FIGURE 14 shows a sectional view of still another modification in accordance with this invention.

Figure 1:
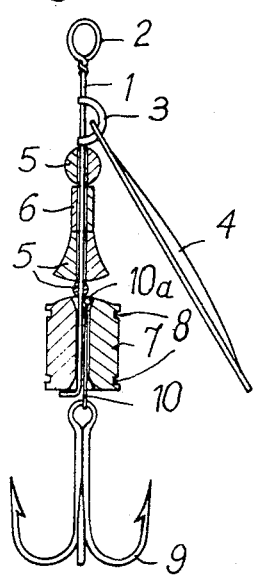
FIGURE 1 is an elevational sectional view of the lure of this invention.
Figure 2:
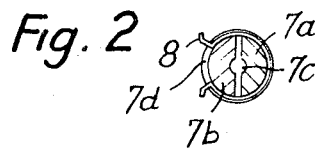
FIGURE 2 is a sectional view of a sinker.

As seen in FIGURE 1 the lure comprises a shank portion 1 terminating in its upper end in a loop 2 which may be attached to a fishing line. A saddle 3 carrying a removable blade 4, rotary pieces 5 on which the saddle 3 bears and a split tubular spacing element 6, freely mounted for rotation on the shank 1. All of these elements are forced on to the shank 1. The lower end of the shank 1 is slightly shouldered and carries a removable sinker 7 comprised of two metallic pieces 7a and 7b (FIGURE 2), having an axial hole 7c for the passage of the shank 1. The pieces 7a and 7b are held together by means of spring clips 8 located in annular grooves 7d formed around these pieces. A hook 9 is attached to a line 10 whose braking strength is lower than that of the fishing line to be used with the lure of this invention. The line 10 is securely held in the axial hole 7c of the sinker 7 and is terminated at its free end by a stop ring 10a.

Figure 3:
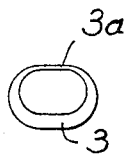
FIGURES 3 and 4 show rings from which the saddles of this invention can be made.
Figure 4:
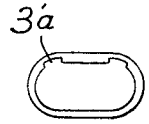

As shown in FIGURE 3, the saddle 3 is made from a ring having a portion 3a of reduced width for mounting the blade thereon, while in the modification shown in FIGURE 4, this ring contains two notches 3'a to be used for mounting a blade. These rings are applied to the shank 1 by presenting the center thereof against the shank and by pressing the two halves on either side of the shank against each other to form a saddle 3 as shown in FIGURE 1.

Figures 5, 6:
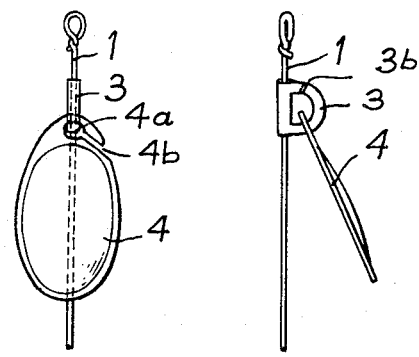
FIGURES 5 and 6 show the removable mounting of a blade on a saddle.

As shown in FIGURE 5, the blade 4 is provided with a slot 4b which connects with the hole 4a. The slot 4b starts tangentially to the base of the hole 4a at a slight angle that opens at the edge of the blade. The blade 4 is mounted on the saddle 3 by engaging the upper branch (corresponding to the reduced portion 3a or the portion having the notches 3'a) of the saddle 3 in the slot 4b of the blade 4 until the hole 4a is reached, the blade 4 then being swung around to allow it to be carried by the lower branch of the saddle.

According to the modification shown on FIGURE 6 of the drawing, the blade 4 is not slotted, but the saddle 3 is provided with an opening 3b in the upper branch thereof.

According to modifications shown in FIGURES 7 and 8, the lure includes a shank 1 which is terminated at its upper end by an attaching loop 2 and at its lower end by a bulging portion 1a. This shank carries:

(a) A shouldered spring blade 6' having mounting holes 6'a formed at its ends and having at least one end thereof terminating in a ring 6'b on which may be mounted a blade 4. This spring blade takes the place of the elastic spacing element and the saddle;

(b) A ball 5 on which the spring blade 6' bears;

(c) At least one lead portion 7 forming a sinker; and (d) A locking element 7' are forming a sinker and comprising a cylindrical cap portion 7'a (FIGURE 8) provided with an axial orifice 7'b having a diameter d' larger than the portion 1a of the shank in order that it may pass over the latter, and a cylindrical trundle 7'c, normally held within the cap with its axis transverse to the shank 1, and provided centrally of its wall with a pair of holes 7'd having radial slots 7'e extending therefrom to the outer edge of trundle 7'c, the diameter of the holes and the width of the slots being less than the diameter of the bulged portion 1a of the shank 1 in order to hold the same thereon, and also with an axial passage 7'f having a diameter which is substantially larger than that of the bulged portion 1a.

A hook 9 is attached to a line 10' terminated by an enlarged portion 10'a, the diameter of which is larger than the width of the slot 7'e in which it is firmly held in the locking device 7'.

The pieces constituting the lure are all completely dismountable (since all of the mounting holes of the pieces 6', 5, 7 have diameters which are larger than that of the enlarged portion 1a of the shank 1). In order to dismount these pieces the spring blade 6' (see FIGURE 8) is compressed in the axial direction of the mounting holes 6'a while the cap portion 7'a of the locking element is pulled upwardly with respect to the trundle portion 7'c in order to disengage it axially from its normal position enclosing the trundle portion 7'c and to space the trundle 7'c axially relative to the cap 7'a. The hook 9 may then be removed and the rotatable pieces 7, 5 and 6' may then be removed from the shank 1.

Moreover, the shank 1, FIGS. 7 and 8 as well as FIG. 1, is preferably connected to an anti-twisting device by the loop 2. This anti-twisting device comprises a flat plate 11 having a substantially oval section, and which is made from a material which is lighter than water, for example, polypropylene. This anti-twisting device is loosely mounted on a line 12 having a swivel 13 on both ends thereof and terminating at its upper end in a loop 14 on which may be attached a fishing line. The central portion of the line 12 carries a sinker 15.

Rotatable member 13a of the swivel 13 also terminates in a loop which may be attached to a fishing tackle, such as a spoon or other lure. One of the sides or wings 11a of the plate has a thickened portion along one edge thereof while the other wing 11b is thinner than the first and provided with weighted means such as lead pellets 15 attached along its circumference and by a line of lead 16 held in a groove 11c formed along the wing.

The plate is further provided with a brake 17 near the swivel 13. This brake may be in the form of a molded or cast funnel and surrounds the body of the swivel 13.

According to the modification shown in FIGURE 11, the loop 14 is replaced by a lead swivel 18, the body of which is fixed to the line 12. The plate 11 also includes two other wings 19 which are formed perpendicular to the plate on both sides thereof.

According to the modification shown in FIGURE 12, the loop 14 is replaced by a lead swivel 18 which is formed integrally with the line 12. This swivel is furthermore protected by a cover 20, for example, made from a molded plastic material, and fixed by heat to the plate 11. The slotted lead weight 21 is forcibly attached to this cover.

In use, the anti-twisting device (FIGURES 7 and 9) is mounted between the fishing line and the lure. In the water, the flat plate stands vertically since the weighted wing 11b is carried into the water.

When fishing, the fishing tackle, when resting in calm water, transmits a twisting couple to the plate 11 by turning the swivel 13 which acts on the plate 11 and therefore tends to stop the rotation of the line.

The forces which act in opposition to this transmitted twisting torque are the following:

(a) The weight of the submerged plate;
(b) The friction force which the more or less rapid unrolling of the fishing line on the reel communicates to the fishing tackle; and
(c) The braking force opposed to the advancement of the line by the brake 17.

In order that these different forces may effectively oppose the action of the twisting torque, the plate 11 must be given a size which is considered to be appropriate in view of the type of swivel used. In this manner, only the movable member of the swivel turns with the fishing tackle and the plate 11 is not turned therewith, therefore preventing the fishing line from being twisted.

Furthermore, the presence of the funnel-shape brake 17 surrounding the swivel 13 and the cover 20 (FIGURE 12) protecting the lead swivel 18 effectively protect the swivels from being harmed or blocked by any aquatic plants.

According to the modification shown in FIGURE 13, especially useful for fishing in deep and calm waters, the flat plate 11' includes two wings 11'a and 11'b of the same thickness and on which are articulated by means of saddles 22 and 22', arms 23 and 23' carrying respectively at their free ends a hollow ball of porous material 24 forming a float and a metallic ball 24' forming a sinker. These arms may be freely pivoted in the plane of the plate 11' between two determined positions limited by the stops 25, 25' and 26, 26' formed in the sides of the corresponding wings. These arms provide only a small resistance to the advancement of the anti-twisting device into the water.

The functioning of this anti-twisting device is practically the same as those described in connection with the device of FIGURE 9. The only difference resides in the fact that outside of the water, the arms 23, 23' fold against the stops 25, 25', but in the water these arms tend to take a vertical position due to the presence of the balls 24 and 24', one of which forms a float and the other a sinker. These arms are independently displaced in the water towards an equilibrium position between the stops 25, 26 or 25', 26' in accordance with the speed of recovery of the fishing tackle.

According to the modification shown in FIGURE 14, more useful in turbulent or tumbling waters, the anti-twisting device is composed of an elongated cylindrical body 27 made from a material such as polypropylene, and on the axis of which is loosely held a line 12 fixed by its ends to an outlet swivel 13 and an inlet swivel 18. The outlet end of the body 27 is extended by a funnel-shape brake 17 surrounding the outlet swivel 13 while the inlet end of this body is reduced in diameter and carries screw threading on which may be screwed a cover 20 having a split lead weight 21 forcibly fixed thereon.

Between this cover 20 and the body 27 a ring 28 is securely held. This ring carries two arms 29 and 29' which project from the body in a plane which passes through the axis of the body 27 and which makes an angle of about 45° with the axis. The upper arm 29 is embedded in a wing 30 having on the end thereof a hollow ball of porous material 31 forming a float. The lower arm 29' is also encased in a wing 30' having at the end thereof a metallic ball 31' forming a sinker.

This modification does not change its movements in rough waters or in currents having turbulent movements and is particularly useful for fishing in turbulent waters.

It should be noted that by using different removable lead weights 21 the depth to which the anti-twisting device descends in the water may be chosen.

What is claimed is:

1. A fishing lure for sport fishing having interchangeable pieces, comprising: a shank terminating at one end in an attaching means to which is to be fixed a fishing line by means of an anti-twisting device; and interchangeable pieces comprising a removable blade; a removable saddle freely rotatably mounted around said shank and on which said removable blade is hung; removable rotatable elements carried on said shank and on which said saddle bears; at least one removable spacing element carried by said shank; a removable sinker mounted on the shank near the other end thereof; means at the other end of the shank for removably connecting the sinker to the shank to maintain the removable pieces in place on the shank; and a hook removably connected to the sinker at the said other end of the shank.

2. A fishing tackle in accordance with claim 1 wherein the saddle is provided with an opening formed on the upper portion thereof.

3. A fishing tackle in accordance with claim 1 in which the spacing element is in the form of a slotted tubular member which is held between the rotating elements.

4. A fishing tackle in accordance with claim 1 wherein the spacing element and saddle are constituted by a shouldered spring blade having mounting holes formed in the ends thereof.

5. A fishing tackle in accordance with claim 4 wherein one of the ends of the spring blade is provided with a ring portion on which the removable blade may be hung.

6. A fishing tackle in accordance with claim 1 in which the sinker comprises two semi-cylindrical pieces having annular grooves formed therein and spring clips are mounted in said grooves.

7. A fishing tackle in accordance with claim 1 wherein said means for removably connecting the hook to the sinker comprises a line which has a breaking strength which is less than that of the fishing line to be used, said line being fastened at one end thereof to the hook and removably connected at the other end thereof to the sinker.

8. A fishing tackle in accordance with claim 4 wherein the lower end of the shank is provided with an enlarged portion having a diameter which is less than the diameter of the mounting holes of all the pieces which are carried on said shank, the sinker providing a locking element comprising a cap element having an axial hole therethrough, the diameter of which is larger than the enlarged portion formed on said shank, and a trundle having on one portion thereof transverse holes each having a diameter which is less than that of the enlarged portion and another portion having an axial passage formed therein the diameter of which is larger than that of the enlargement, and also is provided with slots which extend from said transverse holes to one edge thereof and which have a width which is less than the diameter of said enlargement.

9. A fishing tackle according to claim 8 wherein the hook is attached to a line which terminates in an enlarged portion having a diameter which is larger than that of the slots and the transverse holes.

10. Fishing tackle in accordance with claim 1 in which the anti-twisting device comprises at least one swivel and a weighted float, and wherein said float comprises a flat plate having wing portions provided thereon, means for connecting said swivel to said anti-twisting device at one end thereof, means for connecting the other end of the anti-twisting device to a fishing line, and means connecting said swivel to the shank attaching means.

11. Fishing tackle in accordance with claim 10 in which the weighted float comprises a flat plate made from a material which is much lighter than water, and which is weighted on a portion of its circumference in such manner that the said plate floats vertically in the water.

12. Fishing tackle in accordance with claim 10 in which the weighted float includes a braking cone surrounding said swivel and which opposes the advancement of the anti-twisting device into the water.

13. Fishing tackle in accordance with claim 10 in which the flat plate further includes supplementary wings on both sides of the plate.

14. Fishing tackle in accordance with claim 10 in which the weighted float has two swivel elements successively mounted at either end on the longitudinal axis of said float and in which the leading swivel is provided with a protecting cover.

15. Fishing tackle in accordance with claim 14 in which the cover portion is provided with a removable lead weight which is fixedly attached thereto.

16. Fishing tackle in accordance with claim 10 in which the weighted float comprises a flat plate having two wings of the same thickness and on which are articulated mounted, in the plane of the plate and exteriorly thereof, two arms one of which carries a float and the other of which carries the sinker.

17. Fishing tackle in accordance with claim 10 wherein the weighted float comprises a cylindrical elongated body having a swivel element at each end, and wherein the inlet end of said body is extended by a braking cone surrounding the inlet swivel, the inlet end of said body being screw-threaded so as to threadedly receive a weighted protecting cover; a ring member securely held between said weighted cover and the body; and said ring carrying two arms one of which carries a float and the other of which carries a sinker.

References Cited

UNITED STATES PATENTS

| | | | |
|---|---|---|---|
| 1,867,555 | 7/1932 | Hildebrandt | 43—42.09 X |
| 2,741,057 | 4/1956 | Morris et al. | 43—42.09 |
| 2,940,204 | 6/1960 | Mehnert | 43—42.09 |
| 3,220,139 | 11/1965 | Bessler | 43—42.09 X |
| 1,754,567 | 4/1930 | Newell | 43—42.17 X |

FOREIGN PATENTS

| | | |
|---|---|---|
| 605,667 | 9/1960 | Canada. |
| 959,600 | 10/1949 | France. |
| 172,897 | 9/1960 | Sweden |

SAMUEL KOREN, Primary Examiner

DANIEL J. LEACH, Assistant Examiner

U.S. Cl. X.R.

43—42.13, 42.17, 42.39, 42.4, 43.12, 43.13